3,183,241
PREPARATION OF CERTAIN TRIAZOLES
Phyllis D. Oja, San Francisco, Calif., assignor to The Dow Chemical Company, Midland, Mich., a corporation of Delaware
No Drawing. Filed Feb. 11, 1963, Ser. No. 258,666
4 Claims. (Cl. 260—308)

This invention relates to a novel process for preparing triazoles and more particularly is concerned with a new process for preparing 5-substituted-4-amino-3-hydrazinotriazoles and to certain novel compounds prepared thereby.

These compounds are represented by the empirical formula

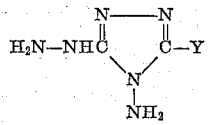

where Y is a substituent member selected from the group consisting of hydroxyl (—OH), mercapto (—SH), amino (—NH$_2$) and hydrazino (—NHNH$_2$).

These compounds exhibit useful antimicrobial action in standard tests therefor.

Heretofore, 5-substituted-4-amino-3-hydrazinotriazoles have been prepared only with great difficulty and in very small yields. There has been no generally applicable method for preparing these compounds although certain members have been prepared by a variety of different methods each of which is useful for a given specie. To illustrate, 4-amino-3,5-dihydrazinotriazole has been reported to have been prepared from the reaction of dicyandiamide and hydrazine [Stollé and Krauch, J. Prakt. Chem., 88, 306 (1913)], or by the reaction of hydrazine salts and guanidine [Stollé and Bowles, Ber., 41, 1101 (1908)].

The preparation of 5-mercapto-4-amino-3-hydrazinotriazole has been reported from the reaction of a variety of sulfur compounds with hydrazine, but yields have been low and the product has been contaminated by many other reaction products. See, for example, Hoggarth, J. Chem. Soc., 1952, 4811–20; Audrieth et al., J. Org. Chem., 19, 733 ff., and Stollé and Bowles, Ber., 41, 1101 (1908).

It is a principal object of the present invention to provide a novel process for preparing certain 5-substituted-4-amino-3-hydrazinotriazoles which is generally applicable.

It is another object of the present invention to provide a process for preparing these compounds in markedly higher yields than by traditional processes.

It is an additional object of the present invention to provide a new process for controllably and smoothly preparing these particularly hydrazinotriazoles without the coproduction of undesirably large amounts of contaminating byproducts.

It is still a further object of the present invention to prepare certain novel 5-substituted-4-amino-3-hydrazinotriazoles.

These and other objects and advantages readily will become apparent from the detailed description presented hereinafter.

In accordance with the present invention, triaminoguanidine in free base form is dissolved or dispersed in an inert, polar organic medium and reacted at a temperature of from about 100 to about 155° C., ordinarily from about 110 to about 150° C., from about 0.5 to about 12 hours or more with a compound of the structure

wherein Z is a member selected from the group consisting of oxygen (=O), sulfur (=S), imino (=NH) and hydrazono (=N—NH$_2$) and, R$_1$ and R$_2$ are members independently selected from the group consisting of amino (—NH$_2$), hydrazino (—NHNH$_2$) and methyl mercapto (—SCH$_3$) and further characterized that if Z is a member selected from the group consisting of =NH and =NNH$_2$, one of the groups, R$_1$ and R$_2$, must also be a member selected from the group consisting of —NH$_2$ and —NHNH$_2$.

The general reaction may be represented by the following equation:

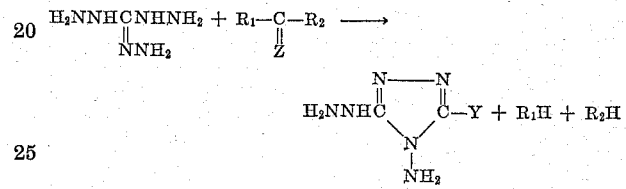

Ordinarily about stoichiometric amounts of reactants are employed, although the desired product can be recovered in somewhat reduced yields at other reactant ratios.

The amount of solvent to be employed is not limiting or critical except that it be such that the least soluble reactant is at least partially dissolved in the solvent at the reaction temperatures, and, that the reaction mixture be sufficiently fluid to permit efficient agitation and heat transfer. Conveniently the weight ratio of solvent to reactants can range from about 1 to about 6 or more.

The reaction ordinarily is carried out at atmospheric pressure employing a solvent for the reactants which has a normal boiling point at least that of the operating temperature. However, if desired, elevated pressures can be employed. Under these latter conditions, solvents having a normal boiling point lower than the predetermined reaction temperature, i.e., from about 110 to about 130° C., can be used.

The temperature range of operation is critical in that at temperatures much below about 100° C. there is substantially no reaction. At temperatures above 155° C. there is detrimental loss of the triaminoguanidine reactant from decomposition and polymerization reactions. Preferably the reaction temperature does not exceed about 150° C. Ordinarily the reaction is carried out at from about 110 to about 150° C. Desirably, the process is carried out over a temperature range of from about 130 to about 145° C.

The reaction time is not critical except that the process is continued for a sufficient period such that a predetermined yield of product is obtained. In general, improved yields are obtained as the reaction time is extended up to about 10 hours or more. Ordinarily, reaction periods of from about 0.5 to about 12 hours, and preferably from about 4 to about 10 hours are employed.

The triaminoguanidine reactant readily is prepared in accordance with the process set forth in a copending application of P. D. Oja and G. E. Hartzell, Serial No. 6059, filed February 1, 1960. In this process triaminoguanidine is produced by contacting an aqueous solution of a salt of triaminoguanidine with a strongly basic quaternary ammonium anion exchange resin in basic form. The resulting aqueous solution of free triaminoguanidine is concentrated and contacted with an organic solvent which is nonreactive with triaminoguanidine and is a solvent for water. The triaminoguanidine is crystallized from the resulting mixture and dried.

The $R_1R_2C=Z$ reactant can be selected from a variety of available organic compounds, this choice being based on the predetermined 5-substituted-4-amino-3-hydrazinotriazole product to be prepared. Dimethyltrithiocarbonate, S,S'-dimethyl dithiocarbonate, triaminoguanidine itself, guanidine, sym.-diaminoguanidine and urea are examples of suitable $R_1R_2C=Z$ reactants of the class defined hereinbefore.

Solvents suitable for use in preparing the homogeneous reaction solution employed in the instant process are selected from the polar organic materials having a sufficiently high boiling point for use at a predetermined reaction temperature and pressure. Conveniently a solvent is selected which boils within the reaction temperature range in order to take advantage of the natural ebullution accompanying this phase change. However, this is not critical since solvents boiling above the reaction temperature range can be used. Also, at elevated pressures, solvents having a normal boiling point lower than the reaction temperature range can be used in the present process. Toluene, xylene, dimethylformamide, ethylene glycol and propylene glycol have been found to be particularly suitable solvents for use at atmospheric pressure.

Dimethylformamide is a very satifactory solvent. In those instances in which this solvent is reactive with amine by-products, no difficulty is encountered in isolation of the desired product. Ethylene glycol has been found to be particularly suitable for use in preparing 4-amino-3,5-dihydrazinotriazole. This latter solvent however is not used with reactions employing thioesters because of its known reactivity with such materials.

The following examples will serve to illustrate further the present invention but are not meant to limit it thereto.

EXAMPLE 1

*Preparation of 4-amino-3,5-dihydrazino-1,2,4(4H)-triazole*

To about 400 milliliters of ethylene glycol were added at room temperature about 100 grams (0.96 gram mole) of triaminoguanidine. The resulting dispersion was heated at about 123–125° C. for about 7.5 hours during which time the theoretical quantity of hydrazine was formed in the reaction mixture. Following the reaction period, the product mixture was cooled and isopropanol added to the solution to aid in the precipitation of the white crystalline 4-amino-3,5-dihydrazinotriazole product.

The identity of the crude 4-amino-3,5-dihydrazinotriazole was confirmed by its melting point of 191–196° C., and by infrared spectroscopy.

Infrared absorption peaks of this material (in a Nujol mull) were: 3.0, 3.05, 6.2, 6.45, 6.7 (weak), 8.0, 8.45, 8.7, 9.25, 9.68, 10.3 (broad), 10.75, 12.0 (broad, weak), 14.35 (very weak), and 14.75 (very weak) microns. Elemental analyses of a typical product were as follows:

|  | Calculated for $C_2H_8N_8$ | Found (Product Analyses) |
|---|---|---|
| C, percent | 16.68 | 16.81 |
| H, percent | 5.59 | 5.64 |
| N, percent | 77.80 | 77.92 |

The identity of the product was substantiated further by preparation of the tris(p-chlorobenzal) and the dihydrochloride derivatives. The former melted with decomposition at 211–212° C. and had the following elemental analyses:

Found: C, 53.93%; H, 3.17%; N, 21.82%; Cl, 20.44%. Calc'd for $C_{23}H_{17}N_8Cl_3$: C, 54.0%; H, 3.3%; N, 22.0%; Cl, 20.8%.

The dihydrochloride salt melted over the range of from 147–163° C. and analyzed as follows:

Found: C, 11.09%; H, 4.64%; N, 51.74%; Cl, 32.45%. Calc'd for $C_2H_8N_8 \cdot 2HCl$: C, 11.0%; H, 4.6%; N, 51.8%; Cl, 32.7%.

The free base compound was tested for biological activity in a standard soluble oil preservative evaluation test.

In this test, a cutting oil (Dromus B oil) is diluted 1:40 with tap water. A small amount of the compound to be tested is added with agitation to 285 cubic centimeters of the dilute oil in a 500 cubic centimeter Erlenmeyer flask. Fifteen cubic centimeters of "spoiled oil" inoculum is added. ("Spoiled oil" inoculum is an oil emulsion that has become contaminated because of bacterial action.) The flask and contents are then agitated at room temperature. Oil samples are taken at intervals over a 48 hour test period and these swabbed onto nutrient agar plates. If the oil has been preserved sterile (i.e. no bacterial growth forming on the nutrient plates) for 48 hours, two more 15 cubic centimeter aliquots of inoculum are added separatedly, one each at a 48 hour interval.

With the present compound, 250 parts per million of 4-amino-3,5-dihydrazino-1,2,4(4H)-triazole were found to kill the bacteria present from the three inoculations.

Initial screening tests for worm control were carried out with the hydrochloride salt to determine the effectiveness of the instant compound against pig ascarids and mouse tapeworm. For these tests, medicated diets containing about 0.12 percent of the dihydrochloride of 4-amino-3,5-dihydrazino-1,2,4(4H)-triazole were fed to mice naturally infected with tapeworms prior to inoculation with a standardized culture of *Ascaris ova* (roundworm of swine). Results of the screening showed this compound to be 100 percent effective against these particular parasites.

EXAMPLE 2

*Preparation of 4-amino-3-hydrazino-5-hydroxytriazole*

About 20.8 grams (0.2 gram mole) of triaminoguanidine was added with continual stirring at room temperature (about 25° C.) to about 150 milliliters of dimethylformamide. About 24.4 grams (0.2 gram mole) of S,S'-dimethyl dithiocarbonate was added to the solution and the resulting reaction mixture gradually heated to the reflux temperature of about 116° C. Large amounts of methylmercaptan were evolved during this heating period.

The reaction mass was maintained at about 116° C. for one hour. Following this period, the product mixture was cooled whereupon about 21.9 grams of crude solid 5-hydroxy-4-amino-3-hydrazinotriazole product separated from the solution. This is equivalent to about a 84.3% yield. After recrystallization from water, the white, needle-like crystals were found to have an observed melting point of about 197–201° C. (with decomposition). Elemental analysis was as follows.

Found: C, 18.46%; H, 4.64%; N, 64.76%; O, 12.14% (by diff.). Calc'd for $C_2H_6N_6O$: C, 18.40%; H, 4.6%; N, 64.85%; O, 12.15% (by diff.).

A parachlorobenzaldehyde derivative was prepared by adding an excess of the aldehyde in methanol to an aqueous solution of the hydroxytriazole and heating, followed by neutralization with 10% aqueous sodium hydroxide. The monobenzal derivative, after recrystallization from methanol-water, was found to melt at 257.5–258.5° C. with decomposition. Elemental analyses:

|  | Calculated for $C_9H_9N_6OCl$ | Found |
|---|---|---|
| C, percent | 42.80 | 43.18 |
| H, percent | 3.57 | 3.43 |
| N, percent | 33.30 | 32.99 |
| Cl, percent | 14.04 | 13.67 |
| O, percent (by diff.) | 6.29 | 6.73 |

A hydrochloride salt of the 5-hydroxy-4-amino-3-hydrazinotriazole was prepared by dissolving a sample of the product in aqueous hydrochloric acid (6 N) and precipitating the salt by methanol addition.

The so-precipitated white crystals were dried and analyzed as follows:

|  | Calculated for $C_2H_8N_6O \cdot HCl \cdot H_2O$ | Found |
|---|---|---|
| C, percent | 13.3 | 13.4 |
| H, percent | 5.0 | 4.7 |
| N, percent | 46.4 | 46.4 |
| Cl, percent | 17.7 | 18.8 |
| O, percent (by diff.) | 17.6 | 16.7 |

A bright, yellow picrate derivative was prepared adding an ethanol solution of picric acid to an aqueous solution of the hydroxy substituted amino hydrazinotriazole product. This compounds melted at about 191–192.5° C. (with decomposition) and analyzed as follows:

|  | Calculated for $C_8H_9N_9O_8$ | Found |
|---|---|---|
| C, percent | 26.8 | 27.3 |
| H, percent | 2.5 | 2.9 |
| N, percent | 35.1 | 35.8 |
| O, percent (by diff.) | 35.6 | 34.0 |

EXAMPLE 3

*Preparation of 4-amino-3-hydrazino-5-mercaptotriazole*

Triaminoguanidine (about 20.8 grams; 0.2 gram mole) was suspended in about 100 milliliters dimethyl-formamide and about 27.7 grams dimethyl trithiocarbonate (0.2 mole) was added with stirring at room temperature.

The resulting mixture was heated slowly to about 116° C. (reflux temperature) during which action considerable quantities of methylmercaptan were evolved. The reaction mass was maintained at reflux for about 4 hours after which time the solution was cooled to room temperature. As the mass cooled, about 8.2 grams (28% yield) of 5-mercapto-4-amino-3-hydrazinotriazole crystallized as pink needles therein. These were recrystallized from water and dried. The product was found to have a melting point of about 228.0–229.5° C. (with decomposition) and an elemental analysis as follows:

|  | Calculated for $C_2H_6N_6S$ | Found |
|---|---|---|
| C, percent | 16.45 | 16.63 |
| H, percent | 4.11 | 3.81 |
| N, percent | 57.50 | 57.46 |
| S, percent | 21.94 | 21.82 |

A benzaldehyde derivative was prepared following the method described for Example 2. This derivative was in the form of light grey needles which melted at 244–245° C. (literature value —246° C.)

Analysis gave:

|  | Calculated for $C_{16}H_{16}N_6S$ | Found |
|---|---|---|
| C, percent | 59.30 | 58.94 |
| H, percent | 4.97 | 4.65 |
| N, percent | 25.95 | 25.63 |
| S, percent | 9.87 | 10.09 |

Likewise triaminoguanidine can be admixed and refluxed in ethylene glycol with guanidine and with urea to give the corresponding 5-substituted triazoles.

Various modifications can be made in the present invention without departing from the spirit or scope thereof for it is understood that I limit myself only as defined in the appended claims.

I claim:

1. A process for preparing 5-substituted-4-amino-3-hydrazinotriazoles corresponding to the formula

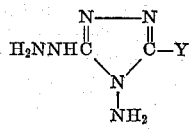

where Y is a member selected from the group consisting of —OH, —SH, —NH$_2$ and —NHNH$_2$ which comprises; mixing triaminoguanidine and a compound of the structure

with a polar organic solvent, wherein Z in said compound is a member selected from the group consisting of =O, =S, =NH and =NNH$_2$, and, R$_1$ and R$_2$ are members independently selected from the group consisting of amino, hydrazino, and methyl mercapto and further characterized in that if Z is a member selected from the group consisting of =NH and =NNH$_2$ one of the groups R$_1$ and R$_2$ in said compound is a member selected from the group consisting of —NH$_2$ and —NHNH$_2$, and heating said mixture at a temperature of from about 100 to about 155° C. for a period of from about 0.5 to about 12 hours.

2. A process for preparing 5-substituted-4-amino-3-hydrazinotriazoles corresponding to the formula

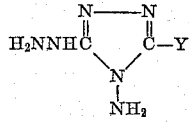

where Y is a member selected from the group consisting of —OH, —SH, —NH$_2$ and —NHNH$_2$ which comprises;

(a) mixing triaminoguanidine and a compound reactant of the structure

with a polar organic solvent, said solvent being a member selected from the group consisting of toluene, xylene, dimethylformamide, ethylene glycol and propylene glycol, Z in said compound reactant being a member selected from the group consisting of =O, =S, =NH, and =NNH$_2$, and, R$_1$ and R$_2$ being members independently selected from the group consisting of amino, hydrazino and methyl mercapto and further characterized in that if Z is a member selected from the group consisting of =NH and =NNH$_2$ one of the groups R$_1$ and R$_2$ of said compound is a member selected from the group consisting of —NH$_2$ and —NHNH$_2$, (b) heating said mixture at a temperature in the range of about 110 to 150° C. for a period of from about 4 to about 10 hours, (c) cooling said mixture thereby to precipitate the corresponding 5-substituted-4-amino-3-hydrazinotriazole product therein, and (d) separating said product from the reaction mass.

3. A process for preparing 4-amino-3,5-dihydrazino-1,2,4(4H)-triazole which comprises;

(a) preparing a dispersion of triaminoguanidine in ethylene glycol, said dispersion having an ethylene glycol-triaminoguanidine weight ratio of about 4;

(b) heating said dispersion at a temperature of about 120–130° C. for about 8 hours, (c) cooling the solution thereby formed to crystallize the 4-amino-3,5-dihydrazinotriazole product therein, and (d) separating said product from the reaction mass.

4. A process for preparing 4-amino-3-hydrazino-5-hydroxy-triazole which comprises;
   (a) preparing a dispersion of triaminoguanidine and S,S'-dimethyl dithiocarbonate in dimethylformamide, said dispersion containing about equal gram-mole quantities of said triaminoguanidine and said S,S'-dimethyldithiocarbonate, said dispersion having a dimethylformamide to triaminoguanidine and S,S'-dimethyldithiocarbonate weight ratio of about 3,
   (b) refluxing said dispersion for about 1 hour,
   (c) cooling the reaction product mixture thereby to precipitate the 4-amino-3-hydrazino-5-hydroxytriazole product therein, and
   (d) separating said product from the reaction mass.

References Cited by the Examiner
UNITED STATES PATENTS
2,352,944   7/44   D'Alelio _____ 260—308

OTHER REFERENCES

Stolle et al.: Ber. Deut. Chem., vol. 41, pages 1099–1102 (1908).

Bruger: Medicinal Chemistry (New York, 1960), pp. 75–77.

IRVING MARCUS, *Primary Examiner.*

NICHOLAS S. RIZZO, *Examiner.*